(12) United States Patent
Beland, Jr.

(10) Patent No.: US 12,043,531 B1
(45) Date of Patent: *Jul. 23, 2024

(54) FLUID TRANSFER DEVICE AND METHOD OF TRANSFERRING FLUID

(71) Applicant: Michael R. Beland, Maiden, NC (US)

(72) Inventor: Michael R. Beland, Jr., Maiden, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/200,078

(22) Filed: May 22, 2023

Related U.S. Application Data

(63) Continuation of application No. 17/850,267, filed on Jun. 27, 2022, now Pat. No. 11,667,506.

(60) Provisional application No. 63/214,876, filed on Jun. 25, 2021.

(51) Int. Cl.
*B67C 11/00* (2006.01)
*B65B 39/00* (2006.01)
*F16N 31/00* (2006.01)

(52) U.S. Cl.
CPC ............ *B67C 11/00* (2013.01); *B65B 39/007* (2013.01); *F16N 31/002* (2013.01); *B67C 2011/20* (2013.01)

(58) Field of Classification Search
CPC ..... F16N 31/002; F16N 31/006; B67C 11/02; B67C 11/00
USPC .................. 141/339; 137/312; D15/150, 152
See application file for complete search history.

(56) References Cited

U.S. PATENT DOCUMENTS

| | | | |
|---|---|---|---|
| 5,117,878 A | 6/1992 | Shaw | |
| 5,199,457 A * | 4/1993 | Miller | E03C 1/186 220/571 |
| 5,291,921 A | 3/1994 | Devine | |
| 5,305,910 A | 4/1994 | Pollacco | |
| 5,402,835 A * | 4/1995 | Middleton | B67C 11/00 141/331 |
| 5,415,210 A | 5/1995 | Hannah | |
| 5,647,415 A | 7/1997 | Onders | |
| 6,988,640 B2 | 1/2006 | Backe | |
| 7,367,164 B2 | 5/2008 | Burton et al. | |
| 8,372,506 B2 * | 2/2013 | Vainshtein | A47B 97/00 428/167 |
| D974,429 S * | 1/2023 | Liao | D15/150 |
| 11,667,506 B1 * | 6/2023 | Beland, Jr. | B67C 11/00 141/331 |

\* cited by examiner

*Primary Examiner* — Timothy P. Kelly
(74) *Attorney, Agent, or Firm* — Schwartz Law Firm, P.C.; Jeffrey J. Schwartz

(57) ABSTRACT

A low-profile fluid transfer device has an annular base with a top and a bottom, and an annular peripheral wall defining an enclosed interior of the base. A plurality of spaced apart straight ridges are formed within the enclosed interior of the base and define respective flow channels. Each flow channel slopes downward from a first end proximate an inside of the annular peripheral wall towards an open second end away from the annular peripheral wall. A catchment area is located adjacent the open second end of each of the flow channels. A drain hole is formed within the catchment area and extends through the base from the top to the bottom.

19 Claims, 6 Drawing Sheets

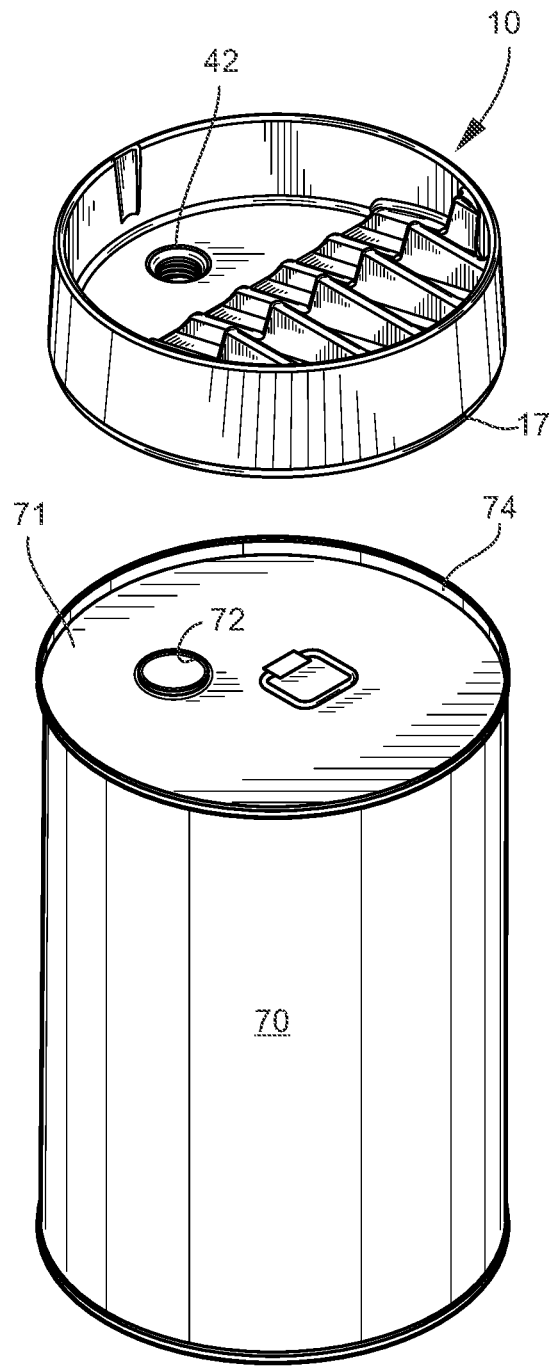
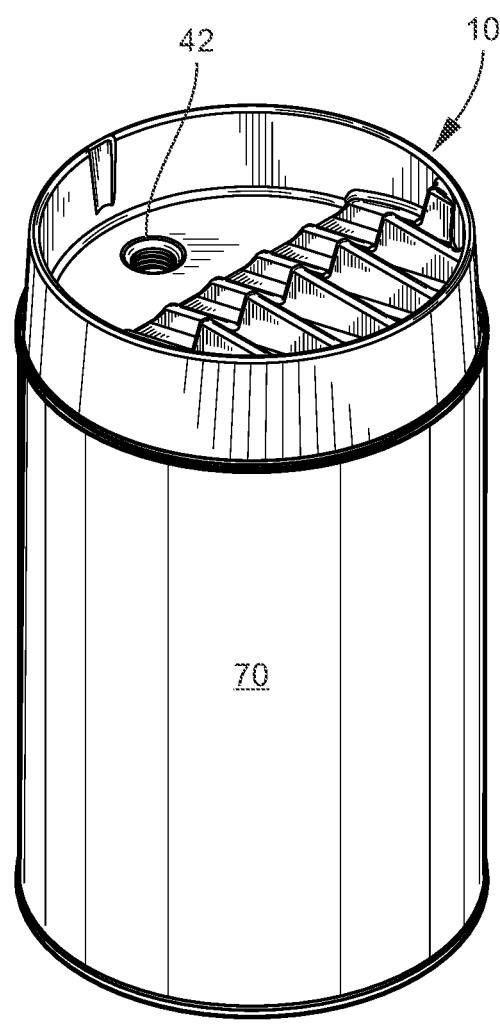
FIG. 12
FIG. 13

FLUID TRANSFER DEVICE AND METHOD OF TRANSFERRING FLUID

TECHNICAL FIELD AND BACKGROUND OF THE DISCLOSURE

The present disclosure relates broadly and generally to a low-profile fluid transfer device and method of transferring fluid from one container to another.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a low-profile fluid transfer device. The exemplary device has an annular base with a top and a bottom, and an annular peripheral (vertical) wall defining an enclosed interior of the base. A plurality of spaced apart straight ridges are formed within the enclosed interior of the base and define respective flow channels. Each flow channel slopes downward from a first end proximate an inside of the annular peripheral wall towards an open second end away from the annular peripheral wall. A catchment area is located adjacent the open second end of each of the flow channels. A drain hole is formed within the catchment area and extends through the base from the top to the bottom.

As used herein, the term "low-profile" means having an overall height of less than about 4 inches, or less than about 25% of the height of the receiving container upon which the fluid transfer device sits.

The term "fluid" refers broadly herein to any substance (such as a liquid or dry granular material) tending to flow or conform to the outline of its container.

The exemplary fluid transfer device is applicable for receiving fluid from any rigid or flexible container or bag, or from any other source capable of holding or dispensing fluid. The exemplary fluid transfer device may receive and temporarily hold the transferred fluid, or may receive and gravity drain the transferred fluid into a second container.

According to another exemplary embodiment, a plurality of vertical splash guards are integrally formed with respective ridges.

According to another exemplary embodiment, each splash guard extends from the inside of the annular peripheral wall and terminates at a midpoint along a length of the ridge.

According to another exemplary embodiment, the open second end of each flow channel terminates at a (straight) notional catchment line extending between two points on the annular peripheral wall. The term "notional" is used herein to mean an imaginary line, or a designated marked line or indicia without structure. In alternative embodiments, the catchment line may include slightly raised linear structure or a slight linear depression formed with the base.

According to another exemplary embodiment, the catchment line is perpendicular to the ridges.

According to another exemplary embodiment, the catchment area comprises a substantially flat surface. The term "flat" means substantially horizontally planar, even and level when the device sits in position atop a container.

According to another exemplary embodiment, a mouth of the drain hole is substantially flush with the catchment area.

According to another exemplary embodiment, the drain hole is cylindrical and extends vertically downward from the bottom of the base.

According to another exemplary embodiment, a removable stopper is adapted for inserting into the drain hole.

According to another exemplary embodiment, the stopper has an external screw thread.

According to another exemplary embodiment, the drain hole has an internal screw thread configured to mate with the external screw thread of the stopper.

According to another exemplary embodiment, the plurality of spaced apart ridges extend parallel to one another.

According to another exemplary embodiment, the plurality of spaced apart ridges comprises at least 5 straight ridges.

According to another exemplary embodiment, each ridge has opposing outwardly angled banks.

According to another exemplary embodiment, a pour notch is formed in the annular peripheral wall of the base. The exemplary pour notch is formed vertically in the thickness of the peripheral wall.

According to another exemplary embodiment, the annular peripheral wall is continuous and closed.

According to another exemplary embodiment, the annular peripheral wall has a vertical height less than 4 inches.

According to another exemplary embodiment, the annular peripheral wall has an annual bottom edge.

According to another exemplary embodiment, the bottom edge of the annular peripheral wall is beveled.

In yet another exemplary embodiment, the disclosure comprises a method of transferring fluid from one container to another. Either or both the transferring and receiving containers may comprise any standard rigid or flexible bucket, pail, bag, or the like, or the exemplary fluid transfer device disclosed further herein.

BRIEF DESCRIPTION OF THE DRAWINGS

Exemplary embodiments of the present disclosure will hereinafter be described in conjunction with the following drawing figures, wherein like numerals denote like elements, and wherein:

FIGS. 12 and 13 are perspective views demonstrating application of the exemplary fluid transfer device onto a standard closed-head tin pail.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
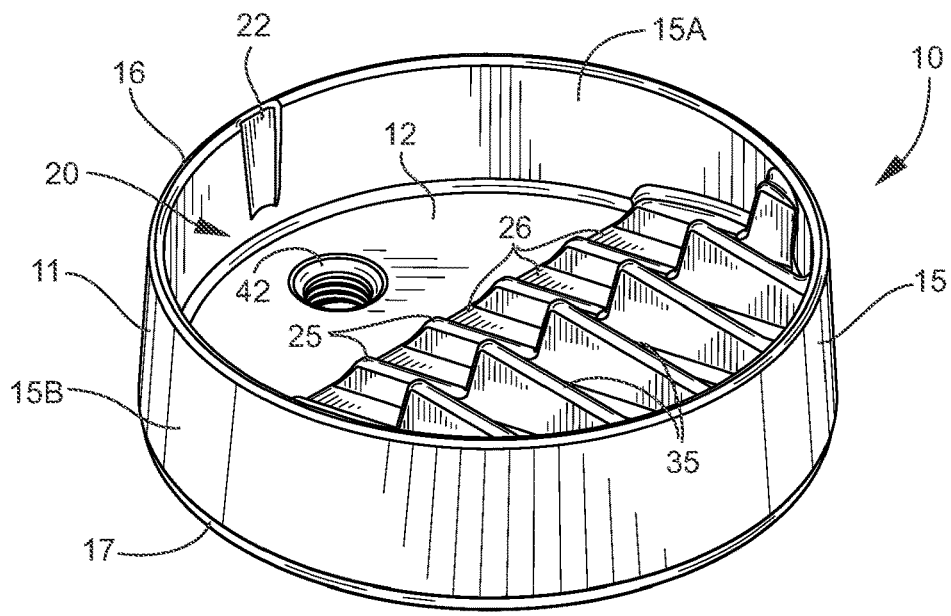
FIG. 1 is a top perspective view of a low-profile fluid transfer device according to one exemplary embodiment of the present disclosure.
Figure 2:
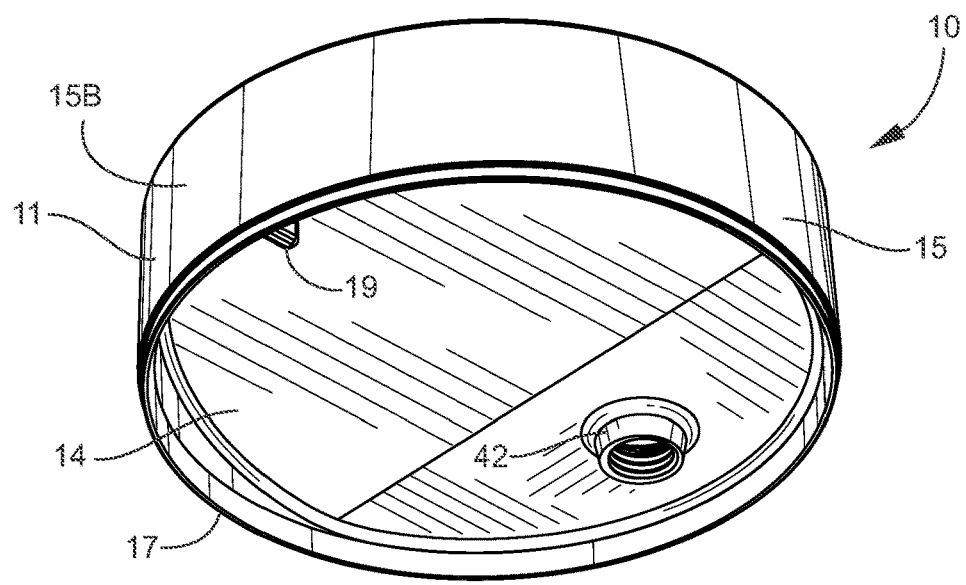
FIG. 2 is a bottom perspective view of the exemplary fluid transfer device.
Figure 3:
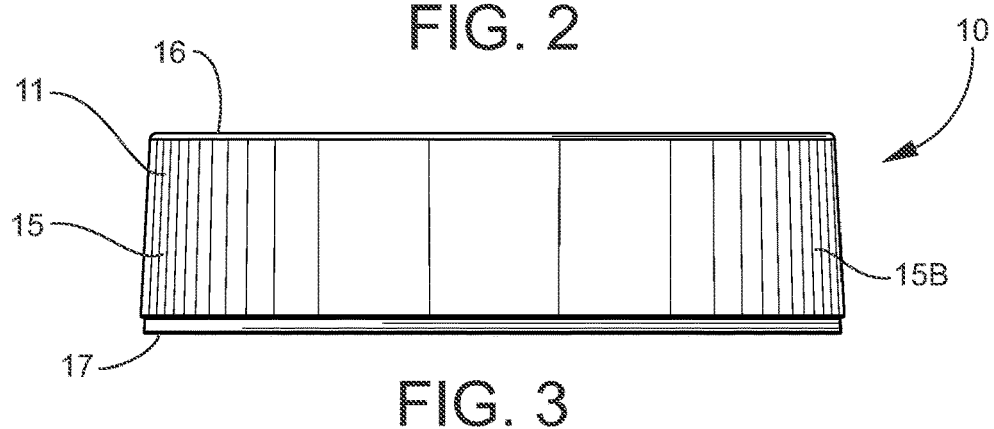
FIG. 3 is a side view of the exemplary fluid transfer device.
Figures 10, 11:
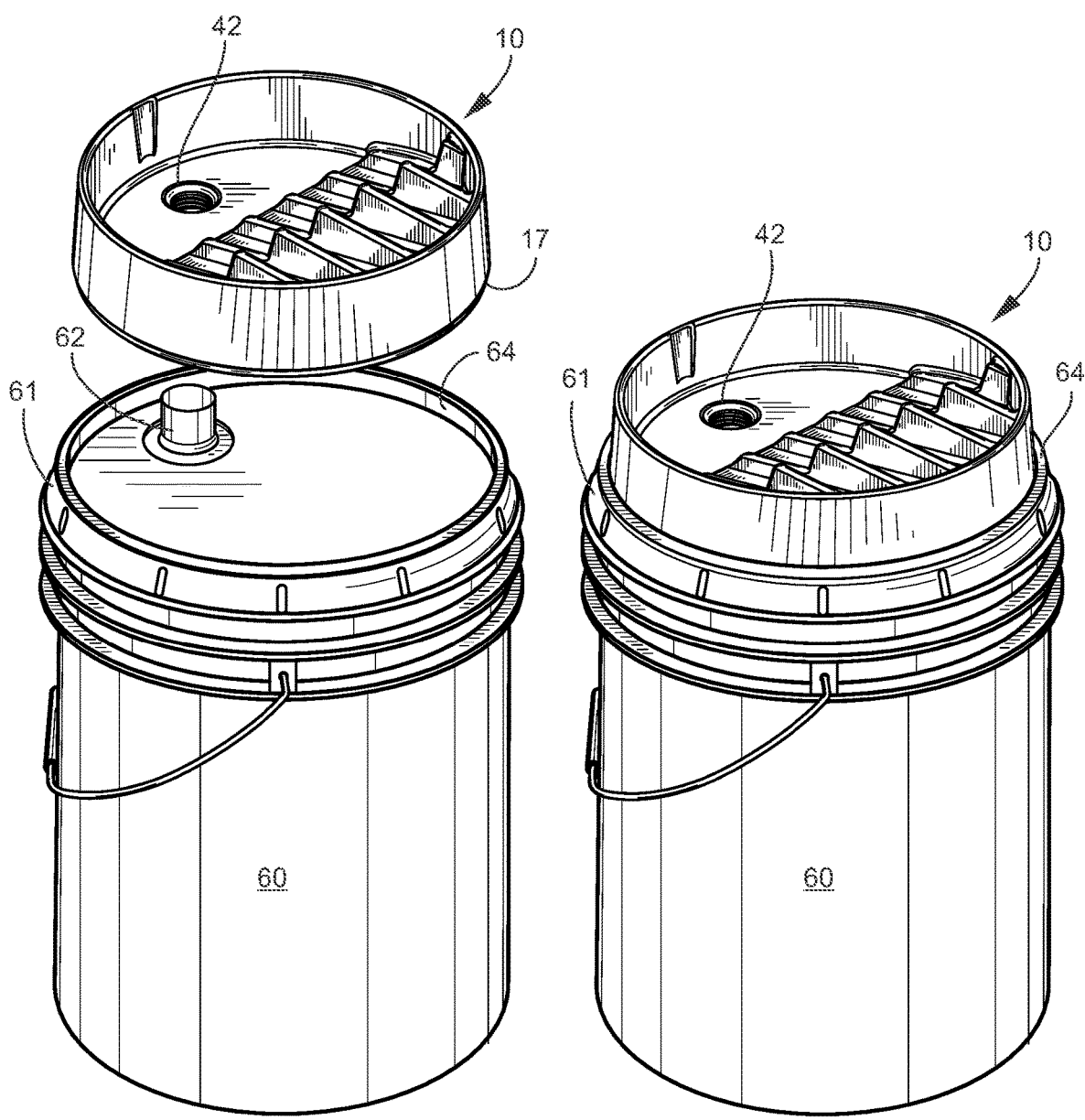
FIGS. 10 and 11 are perspective views demonstrating application of the exemplary fluid transfer device onto a standard plastic bucket.

Referring now specifically to the drawings, a low-profile fluid transfer device according to one exemplary embodiment of the present disclosure is illustrated in FIGS. 1, 2 and 3 and shown generally at broad reference numeral 10. In exemplary embodiments, the present fluid transfer device 10 is applicable for use with a variety of different plastic and metal fluid containers for storing fuel, oil, paint, chemicals and other liquids. See containers 60, 70 in FIGS. 10 and 12. In other embodiments, the exemplary device 10 may be used for transferring loose dry granular material, such as grass seed and fertilizer, from flexible bags to containers such as shown in FIGS. 10 and 12. The fluid transfer device 10 may be formed (e.g, molded) of any polymer or other lightweight rigid material.

As shown in FIGS. 1, 2, and 4-6, the exemplary fluid transfer device 10 has an annular base 11 with a top 12 and a bottom 14, and a peripheral (vertical) wall 15 having an inside 15A and outside 15B and annular top and bottom edges 16, 17. The peripheral wall 15 is continuous and closed, and a defines an enclosed interior 20 between the top 12 of the base 11 and inside 15A of the peripheral wall 15. In exemplary embodiments, the enclosed interior 20 is configured to receive and temporarily hold between 1-3 quarts of fluid. The exemplary peripheral wall 15 has a thickness of approximately 0.25 inches, a diameter "D" of approximately 10 and a height "H" of approximately 3 inches. A pour notch 22 may be cut vertically in the thickness of the peripheral wall 15, as best shown in FIG. 1. The bottom edge 17 of the peripheral wall 15 may be beveled to facilitate placement of the fluid transfer device 10 atop the fluid receiving container. For added stability and support, a vertical spacer 19 is integrally molded with the bottom 14 of the base 11 and further functions to properly level the fluid transfer device 10 on the fluid receiving container during use.

Figure 6:
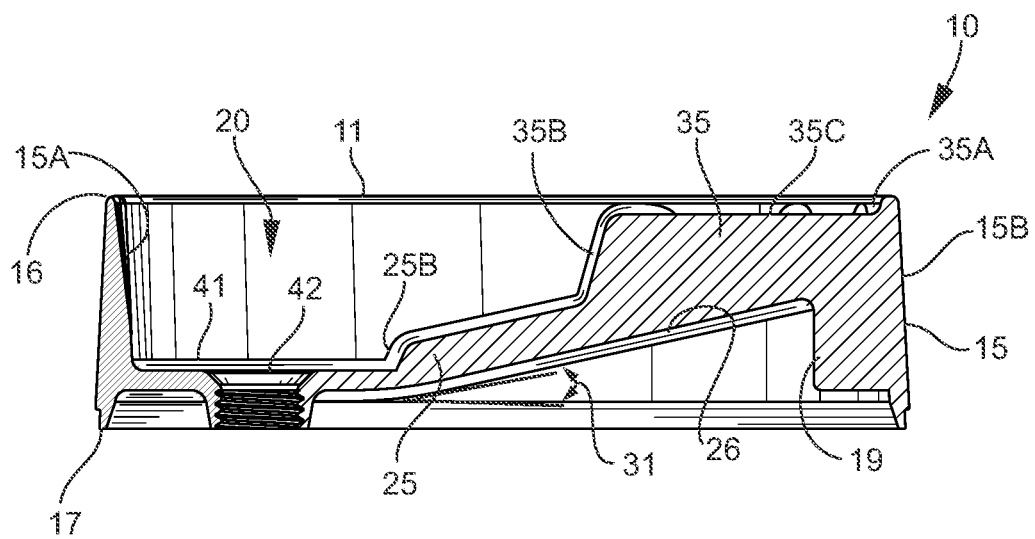
FIG. 6 is a further cross-sectional view of the exemplary fluid transfer device.
Figure 7:
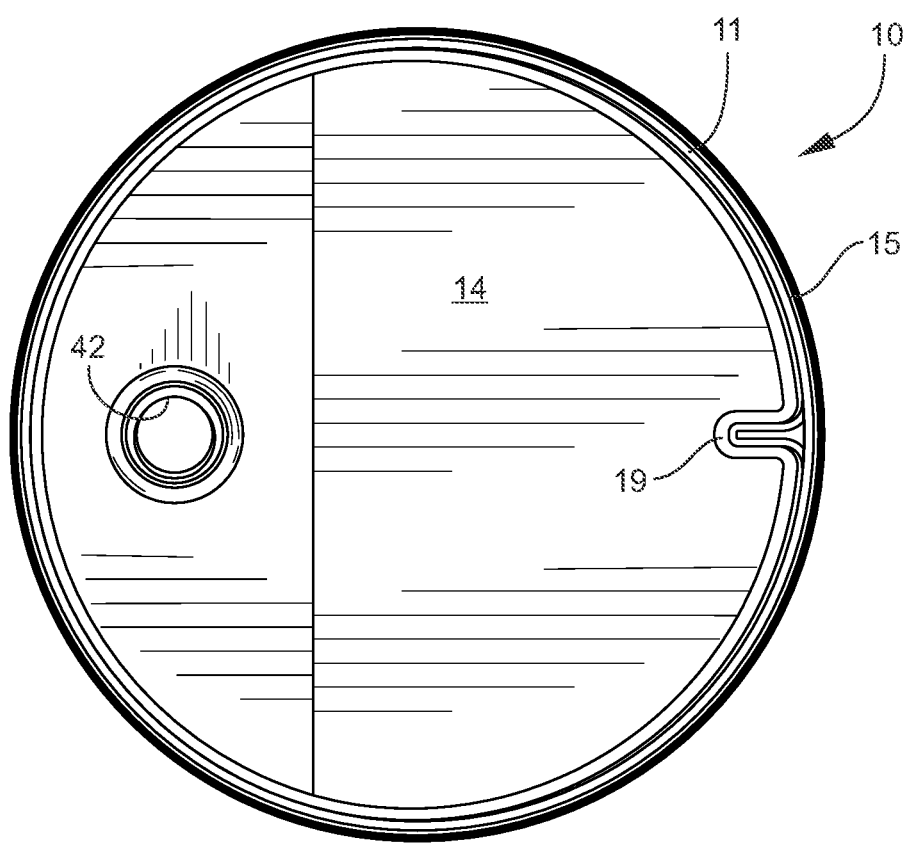
FIG. 7 is a bottom view of the exemplary fluid transfer device.

A number of spaced apart straight ridges 25 are integrally formed (e.g., molded) with the top 12 of the base 11 within the enclosed interior 20. Adjacent ridges 25 cooperate to define shallow flow channels 26. The ridges 25 extend parallel to one another, and are formed at proximal ends 25A to the inside 15A of the peripheral wall 15. Distal ends 25B of the ridges 25 extend away from the peripheral wall 15 and terminate at a notional catchment line 30, best shown in FIG. 4. In the exemplary embodiment, the fluid transfer device 10 comprises five spaced apart straight ridges 25 forming six divided shallow flow channels 26. Each flow channel 26 slopes downward from a closed end 26A proximate the inside 15A of the peripheral wall 15 towards an open second end 26B located at the catchment line 30. The exemplary slope angle 31, shown in FIG. 6, is approximately 30 degrees. Each ridge 25 has a height of about 0.25 to 0.50 inches, and may comprising opposing outwardly angle banks 33, 34. Each flow channel 26 is approximately 1.0 inches wide.

To facilitate transfer of product into the fluid transfer device 10, a plurality of straight vertical splash guards 35 may be integrally molded with respective ridges 25. The splash guards 35 extend from the inside 15A of the annular peripheral wall 15, and all terminate at midpoints along lengths of the ridges 25. The proximal end 35A of each splash guard 35 may be integrally molded with the inside 15A of the peripheral wall 15, and the height of each splash guard 35 at its distal end 35B is approximately 1.0 inches. The tops 35C of the splash guards 35 extend to a common horizontal plane parallel to a horizontal plane of the peripheral wall's annular top edge 16. In exemplary embodiments, distal ends 35B of the splash guards 35 terminate at a notional splash guard termination line 40 best represented in FIG. 4. The splash guard termination line 40 extends in a straight line between two points on the peripheral wall 15, perpendicular to the ridges 25 and parallel to the notional catchment line 30.

Figure 4:
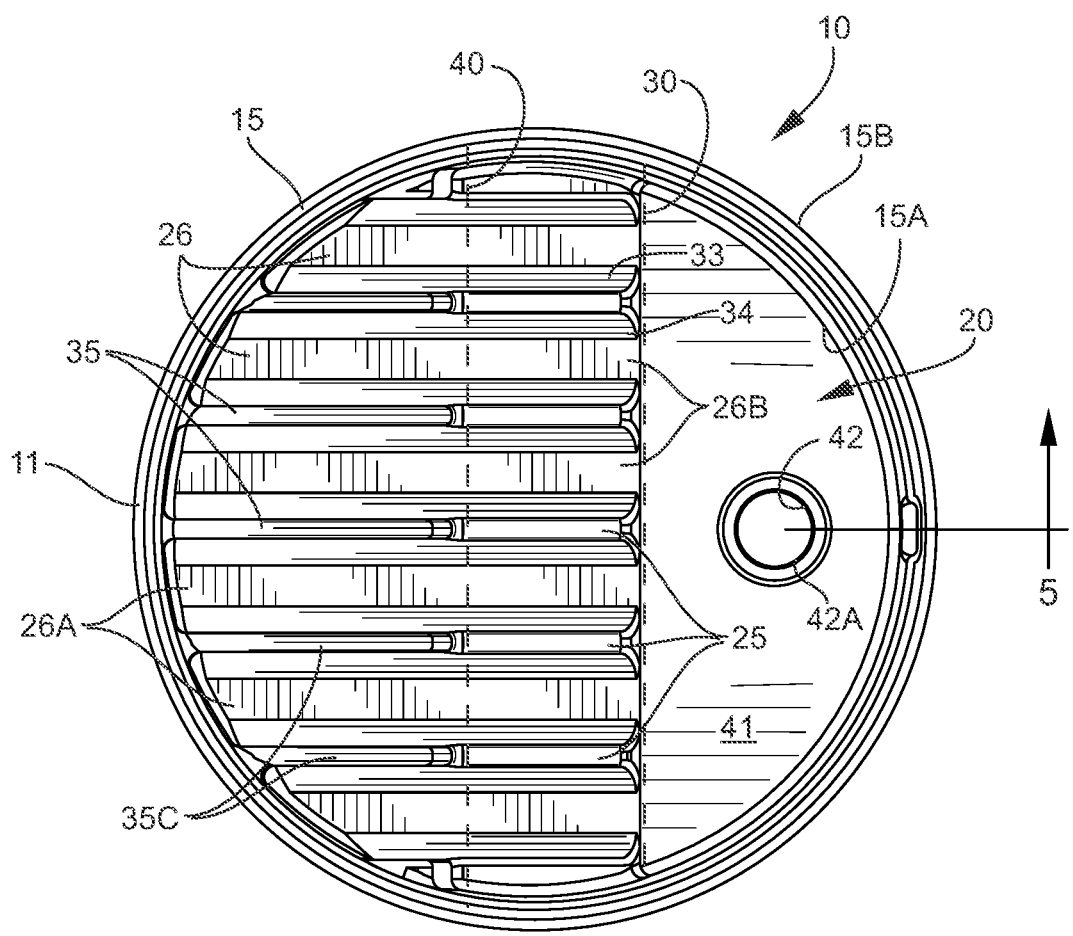
FIG. 4 is a top view of the exemplary fluid transfer device.
Figure 5:
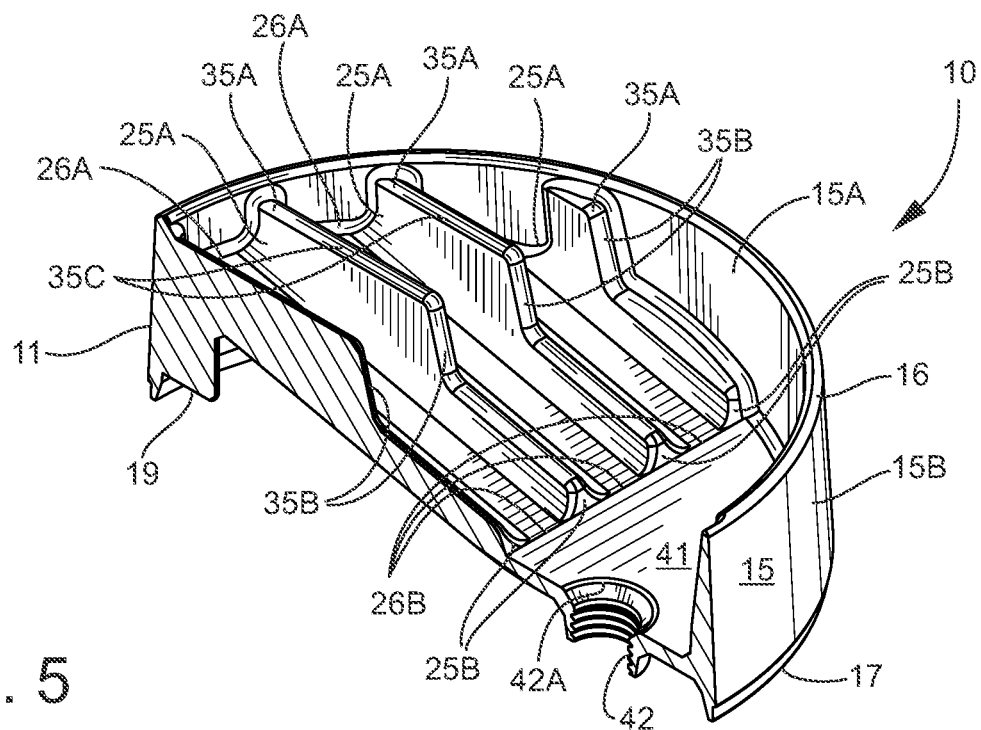
FIG. 5 is a cross-sectional view of the exemplary fluid transfer device.
Figure 8:
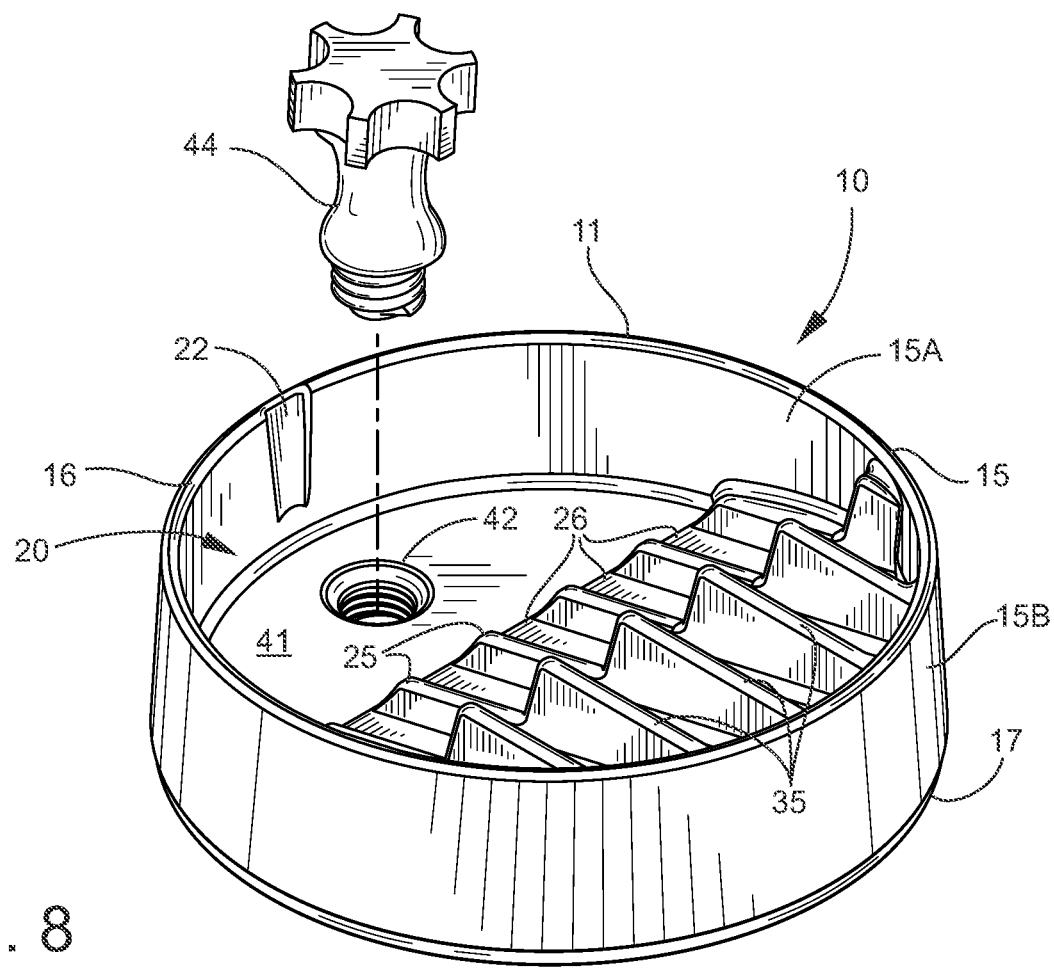
FIGS. 8 and 9 are perspective views demonstrating application of the removable elongated stopper to the drain hole of the exemplary fluid transfer device.
Figure 9:
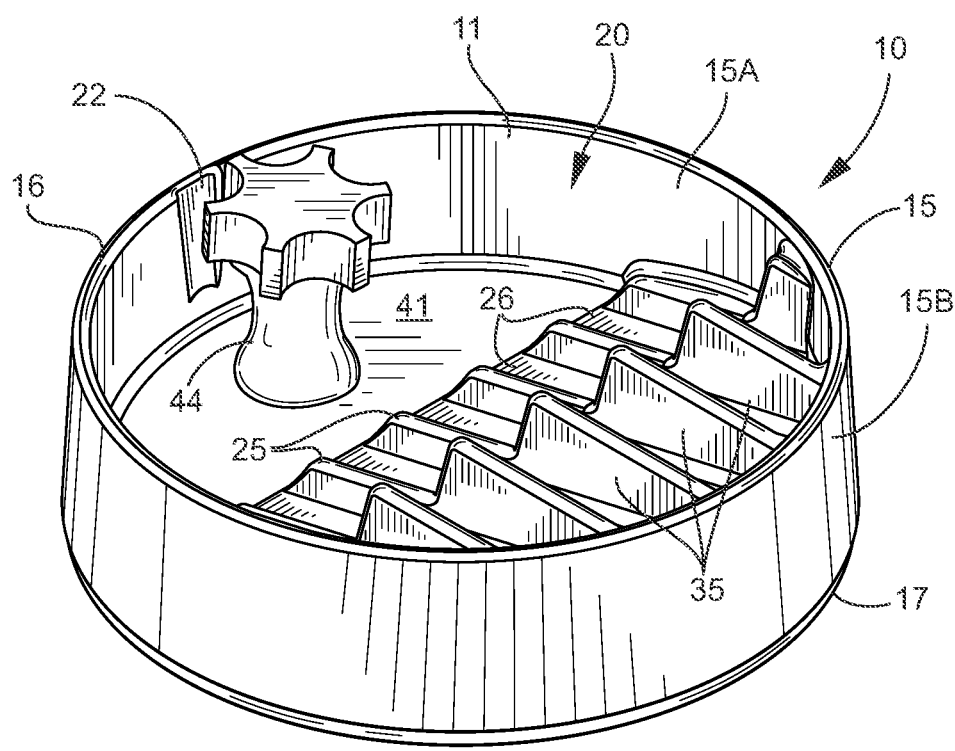

The catchment line 30 likewise extends in a straight line between two points on the peripheral wall 15—perpendicular to the ridges 25. As best shown in FIGS. 4 and 5, the open ends 26B of the flow channels 26 at the catchment line 30 allow fluid to gravity-flow into a substantially flat and level catchment area 41 within the base interior 20. The catchment area 41 is defined by the catchment line 30 and a portion (minor arc) of the peripheral wall 15. A cylindrical drain hole 42 is formed in the catchment area 41 and extends vertically downward through the base 11 from the top 12 to the bottom 14. A mouth 42A of the drain hole 42 is substantially flush with a surface of the catchment area 41. In exemplary embodiments, the drain hole 42 has an internal screw thread configured to sealably mate with an external screw thread of a removable elongated stopper 44. See FIGS. 8 and 9. When inserted from the top 12 of the base 11, the elongated stopper 44 closes the drain hole 42 and prevents contaminates from entering the receiving container after product is poured and moved from the transferring container. When inserted from the bottom 14 of the base 11, the elongated stopper 44 seals the drain hole 42 and forms a handle for carrying the fluid transfer device 10. In this exemplary embodiment, the device 10 may be used by painters for holding paint within the enclosed interior 20 of the base 11.

FIGS. 10-11 show the exemplary fluid transfer device 10 used with a plastic bucket 60 (e.g., 5, 6 and 7 gallon)—the "receiving bucket". The exemplary bucket 60 has a conventional snap-on/snap-off lid 61 with an extendable 2-inch pour spout 62 and removable cap (not shown). Before applying the fluid transfer device 10, the pour spout 62 of the receiving bucket 60 is extended and the cap removed. The fluid transfer device 10 is then oriented and aligned such that the cylindrical drain hole 42 extends inside the pour spout 62 as the device 10 is placed onto the receiving bucket 60. The pour spout 62 collapses back into the receiving bucket 60, and the annular beveled edge 17 of the base 11 sits inside an annular top lip 64 of the bucket 60. The top lip 64 prevents the fluid transfer device 10 from shifting as product is poured from the transferring container (not shown), and passes through the drain hole 42 of the device 10 into the receiving bucket 60. The transferring container may be identical to the receiving bucket 60, or may be any other rigid or flexible container suitable for holding a fluid. After completing the product transfer into the receiving bucket 60, the fluid transfer device 10 is lifted and removed and the cap replaced onto the pour spout 62.

FIGS. 12 and 13 show the exemplary fluid transfer device 10 used with a conventional 5-gallon tin pail 70. The exemplary tin pail 70 has a closed head 71 with a standard 2-inch NPT bung hole 72, and top annular lip 74. As described above, the fluid transfer device 10 is oriented and aligned such that the cylindrical drain hole 42 extends inside the bung hole 72 as the device 10 is placed onto the closed head 71 of the receiving pail 70. The annular beveled edge 17 of the base 11 sits inside the top lip 74 of the receiving pail 70, thereby preventing the fluid transfer device 10 from shifting as product is poured from the transferring container (not shown) into the pail 70.

In further alternative embodiments, the fluid transfer device 10 may be fabricated (e.g., molded) on a larger proportional scale and used with larger containers including 55-gallon drums and the others. The exemplary fluid transfer device 10 may rest freely atop the receiving container, as described above, or may be screwed onto, snap-attached or otherwise removably secured to the container.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) is not intended. Additionally, it is not intended that the scope of patent protection afforded the present invention be defined by reading into any claim a limitation found herein that does not explicitly appear in the claim itself.

What is claimed:
1. A low-profile fluid transfer device, comprising:
an annular base having a top and a bottom, and an annular peripheral wall defining an enclosed interior of said base;
a plurality of spaced apart straight ridges formed within said enclosed interior of said base and defining respective flow channels, each flow channel sloping downward from a first end proximate an inside of said annular peripheral wall towards an open second end away from said annular peripheral wall;
a plurality of vertical splash guards, each integrally formed with a respective one of said plurality of spaced apart ridges, and wherein each splash guard extends from the inside of said annular peripheral wall and terminates at a midpoint along a length of said respective ridge; and
a catchment area adjacent the open second end of each of said flow channels, whereby said catchment area receives fluid transferred into said low-profile fluid transfer device.
2. The low-profile fluid transfer device according to claim 1, wherein the open second end of each flow channels terminates at a notional catchment line extending between two points on said annular peripheral wall.

3. The low-profile fluid transfer device according to claim 2, wherein said catchment line is perpendicular to said ridges.

4. The low-profile fluid transfer device according to claim 1, wherein said catchment area comprises a substantially flat surface.

5. The low-profile fluid transfer device according to claim 1, wherein said base defines a drain hole, and wherein a mouth of said drain hole is substantially flush with said catchment area.

6. The low-profile fluid transfer device according to claim 1, wherein said base defines a drain hole, and wherein said drain hole is cylindrical and extends vertically downward from the bottom of said base.

7. The low-profile fluid transfer device according to claim 6, and comprising a removable stopper adapted for inserting into said drain hole.

8. The low-profile fluid transfer device according to claim 7, wherein said stopper has an external screw thread.

9. The low-profile fluid transfer device according to claim 8, wherein said drain hole has an internal screw thread configured to mate with the external screw thread of said stopper.

10. The low-profile fluid transfer device according to claim 1, wherein said plurality of spaced apart ridges extend parallel to one another.

11. The low-profile fluid transfer device according to claim 1, wherein said plurality of spaced apart ridges comprises at least 5 straight ridges.

12. The low-profile fluid transfer device according to claim 1, wherein each ridge has opposing outwardly angled banks.

13. The low-profile fluid transfer device according to claim 1, and comprising a pour notch formed in said annular peripheral wall of said base.

14. The low-profile fluid transfer device according to claim 1, wherein said annular peripheral wall is continuous and closed.

15. The low-profile fluid transfer device according to claim 1, wherein said annular peripheral wall has a vertical height less than 4 inches.

16. The low-profile fluid transfer device according to claim 1, wherein said annular peripheral wall has an annual bottom edge.

17. The low-profile fluid transfer device according to claim 16, wherein the bottom edge of said annular peripheral wall is beveled.

18. A method for transferring a fluid, said method comprising:
    pouring a fluid from a container into a low-profile fluid transfer device, the low-profile fluid transfer device comprising a plurality of spaced apart straight ridges defining respective flow channels, each flow channel sloping towards a catchment area, and a plurality of vertical splash guards, each integrally formed with a respective one of the plurality of spaced apart ridges, and wherein each splash guard extends from an inside peripheral wall of the fluid transfer device and terminates at a midpoint along a length of the respective ridge; and
    directing the fluid along the sloping flow channels to the catchment area of the low-profile fluid transfer device.

19. The method according to claim 18, and comprising draining the fluid from the catchment area into a second container.

\* \* \* \* \*